T. FERGUSON.
DYNAMO ELECTRIC MACHINE.
APPLICATION FILED MAY 15, 1909.
1,070,437.
Patented Aug. 19, 1913.
2 SHEETS—SHEET 1.
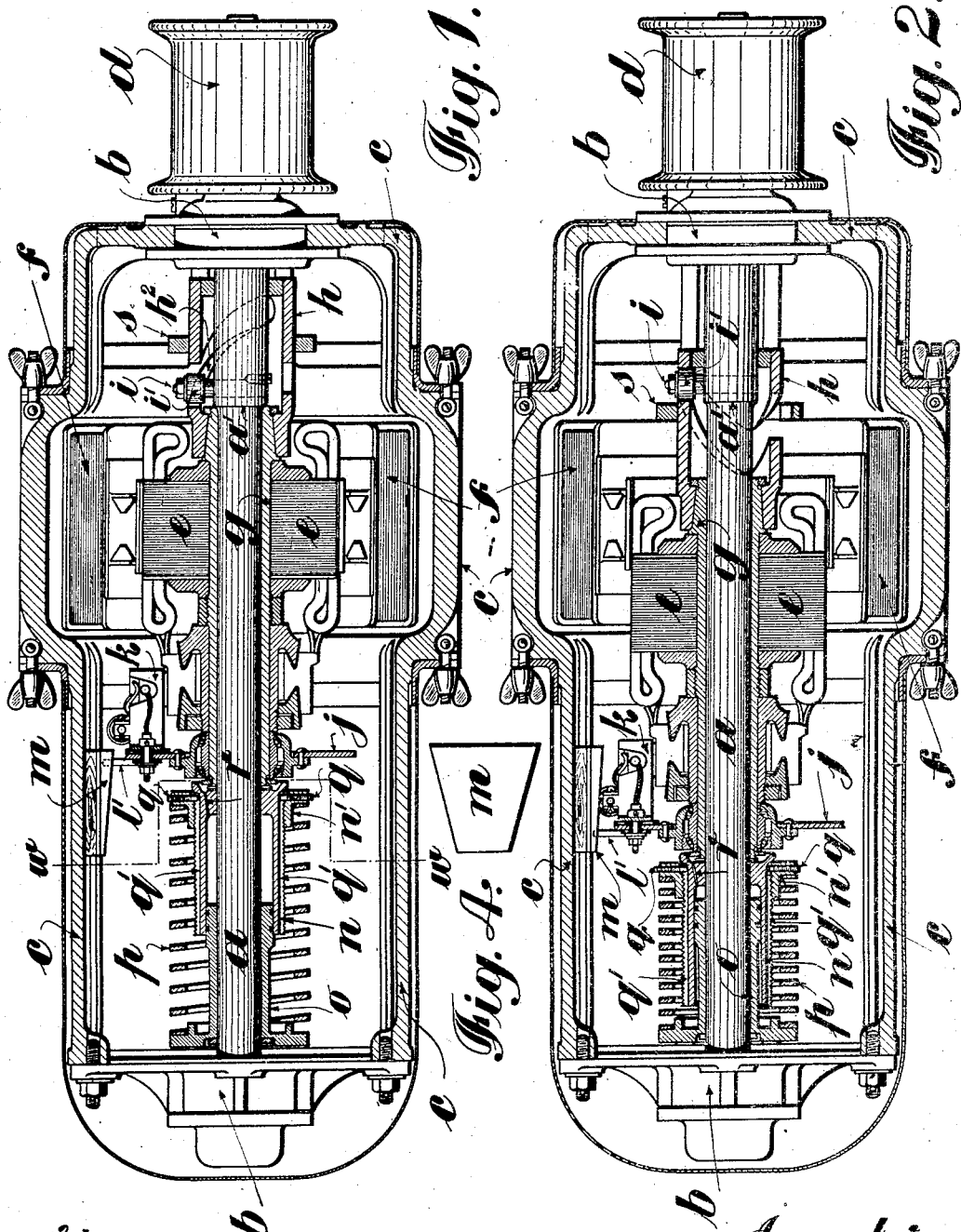

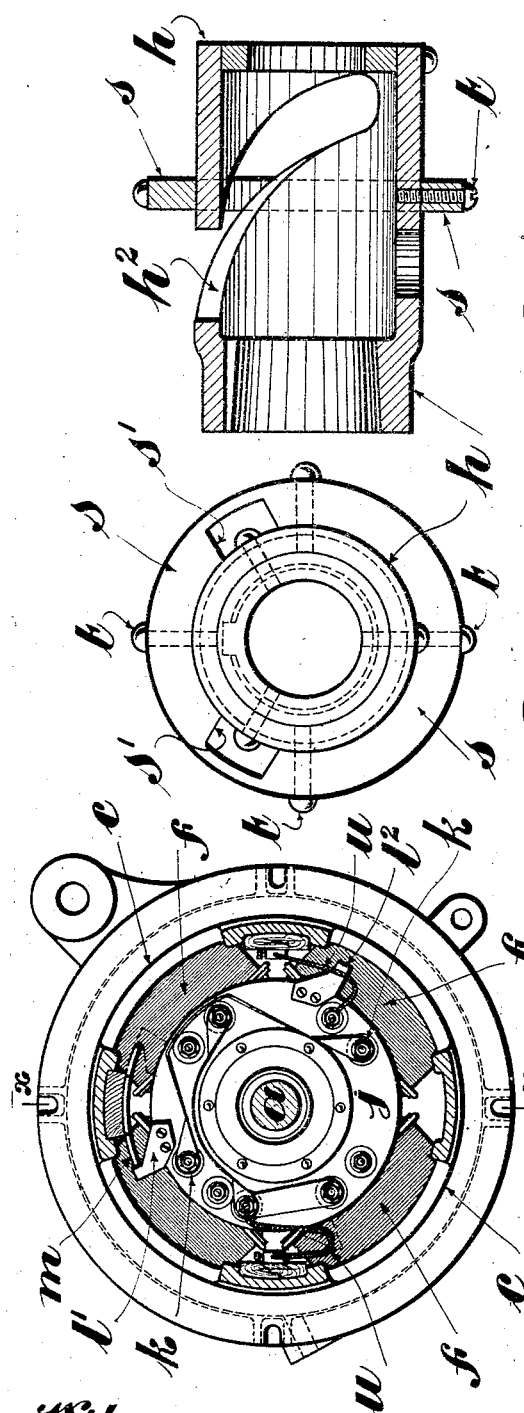
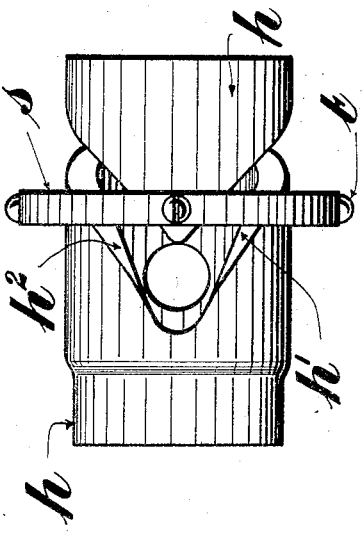
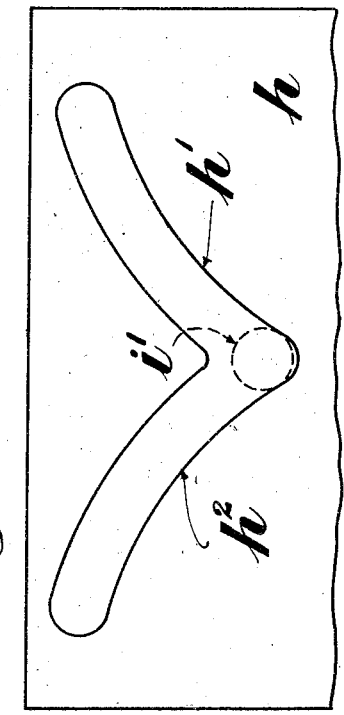

UNITED STATES PATENT OFFICE.

THOMAS FERGUSON, OF ALTRINCHAM, ENGLAND.

DYNAMO-ELECTRIC MACHINE.

1,070,437.  Specification of Letters Patent.  Patented Aug. 19, 1913.

Application filed May 15, 1909. Serial No. 496,245.

*To all whom it may concern:*

Be it known that I, THOMAS FERGUSON, a subject of the King of Great Britain and Ireland, and resident of Altrincham, Cheshire, England, have invented certain new and useful Improvements in and Relating to Dynamo-Electric Machines, of which the following is a specification.

This invention refers to dynamo-electric machines and relates to new or improved means for automatically regulating the output of such machines when driven at varying speeds.

The chief uses of the invention will be for dynamos used for train lighting and ventilating where the dynamo is driven from the carriage axle, or with dynamos used in electric lighting plants, where the power is obtained from a prime mover, such as a windmill or water-wheel and where the power available, as regards speed, is difficult of control. Such machines are almost invariably used in conjunction with storage batteries and broadly speaking may be divided into two classes, namely, those which maintain constant voltage independently of the external circuit, and those which depend on the external circuit for their regulation, or, in other words, which tend to maintain more or less a constant current, the storage battery maintaining the external circuit comparatively uniform. This invention broadly speaking may be said to belong to the latter class.

In either class of machine, the effective magnetic field passing through the armature must be reduced as the speed rises above the normal in order to obtain the desired regulation. Well known methods of attaining this consist in gradually introducing resistances into the field magnet circuit as the speed rises, or in sliding the armature in an endwise direction out of the magnetic field, and well known methods of performing these functions consist in the use of centrifugal governors.

This invention deals with means for reducing the magnetic field which are characterized by the direct regulation of the driving torque of the dynamo whereby such torque becomes less as the speed rises above the normal and greater as the speed decreases down to normal, thereby causing the dynamo to maintain a constant current with varying speeds. A further characteristic of the said means is that the torque is transmitted through two contacting faces, one of which is curved and inclined and bears a definite relation to the output of current in relation to the speed.

The indirect use of the driving torque has been previously proposed in cases where it is desired to maintain a constant driving torque and speed on the crank shaft of an engine under varying conditions of external circuit, but the current has been the varying factor, while the speed, torque and output have remained constant; but this invention is distinct from any such arrangements in that it provides for automatically varying the torque as the speed varies and keeps the current constant, thus the speed and torque are the varying factors while the current and voltage remain constant.

The present invention also deals with improved means for automatically altering the brush "lead" as the speed varies so as to eliminate sparking which is apt to be troublesome in variable speed dynamos at high speeds.

Upon the accompanying drawings, Figure 1 illustrates a longitudinal sectional elevation on line $x$—$x$ Fig. 3 of a dynamo as adapted say for train-lighting purposes, and with the invention applied thereto in the form in which it serves to regulate the effective magnetic field by sliding the armature out from between the magnet poles. In this view the armature is shown in the normal or minimum speed position. Fig. 2 illustrates a like view but showing the armature in the maximum speed position. Fig. 3 illustrates a transverse sectional elevation of Fig. 1 on line $w$—$w$. Fig. 4 illustrates a detached plan of an important part hereinafter referred to. Fig. 5 illustrates, to a larger scale, an end view, Fig. 6 a longitudinal section, and Fig. 7 a plan of the aforesaid part having the inclined, or specially shaped torque-controlling faces, and which part is hereinafter called the "regulator". Fig. 8 illustrates a development of such regulator, or as it appears in the flat.

Referring to Figs. 1 to 8 and the application of the invention to the sliding of the armature, $a$ is the driving shaft of the dynamo which at each end is supported in bearings $b$ formed in the dynamo casing $c$, the bearings being such as to support the shaft and also to prevent the shaft moving endwise. $d$ is a belt pulley keyed to the shaft and by which motion is transmitted to the shaft. *e* is the armature, and *f*, *f* are the field magnet poles.

Instead of the armature being mounted as usual directly upon the shaft *a* it is now mounted upon and rigidly fixed to a hollow shaft or "spider" *g*, and such spider, instead of being keyed to the shaft, is normally free to rotate around and slide along the shaft. Upon one end of the spider is rigidly mounted the regulator *h* comprising a tubular extension in which is cut a slot which produces diverging curved and inclined edges $h'$, $h^2$, see Figs. 6, 7 and 8, the inclinations of which are constantly changing.

Fixed in the shaft *a* is a pin or peg *i* which lies at right angles to the periphery of the shaft, and upon which is a roller $i'$ adapted to lie within the slot in the regulator as shown, and press against the edge $h'$, or $h^2$ according to the direction of rotation of the shaft.

Upon the other end of the spider *g* is loosely mounted, by means of suitable bearings, a frame or plate *j*. By this latter are carried the insulated brush holders *k* and also two stops *l*, *l'* (see Fig. 3) oppositely set and one adapted, on the frame being given a partial rotation in one direction, to bear against one edge of a fixed stop *m* on the dynamo casing, and the other adapted, on the frame being given a partial rotation in the opposite direction, to bear against the other edge of the stop *m*. Upon the shaft *a* is a shoulder $a'$ and against such shoulder normally abuts the spider *g*, see Fig. 1. Between the other end of the spider, or a collar *n* (loose or free to slide on the shaft) and a collar *o* (fixed or keyed to turn with the shaft) and also encircling the shaft, is a spiral spring *p*. By means of the spring the spider is pressed against the shoulder $a'$. For regulating the tension of the spring the collar *n* is provided with a screw thread, and a nut $n'$, which latter, after being adjusted, is held against rotation relatively to the collar, by set screws *q*, the points of which project into grooves $q'$.

The action of the improved regulating devices may be described as follows:—Power is transmitted to the shaft *a* by means of a belt and the pulley *d*. The driving torque is, in turn, transmitted from the shaft to the armature by the peg *i* pressing upon one or other of the inclined edges of the regulator *h*. So long as the driving torque acting between the peg and regulator does not produce a component force which exceeds the initial pressure of the spring *p*, plus the magnetic pull tending to draw the armature back, plus the friction to oppose the motion of sliding, the armature will be rotated in the usual plane, but so soon as such force overbalances the initial pressure of the spring the regulator *h* then begins to slip against the peg *i* and impart an endwise motion to the spider *g*. In thus moving the spider the armature is moved out from between the magnet poles, see Fig. 2, thereby diminishing the magnetic field passing through the armature. With a decrease in the said force impelling the spider endwise along the shaft the spider and armature are automatically returned by permission of the regulator under the pressure of the spring, the regulator slipping the abutment with the peg in one way or the other with the increase or decrease of the force exerted by the peg.

As for a given output, the driving torque must decrease as the speed increases, the slope of the regulator edges are cut with a gradually varying inclination so that at all positions of the armature, corresponding to the various speeds, a balance is obtained between the aforesaid component force and the resisting force of the spring, plus the aforesaid magnetic attraction and friction of sliding parts.

To determine the shape of the regulator, the correct positions of the armature corresponding to the various speeds for a predetermined output are determined by calculations or experimentally, as also the forces required to compress the spring over its working range and the magnetic pull and friction opposing the sliding. The driving forces of the peg are also calculated from the output (allowing for efficiences) at the various speeds. These being determined, the slopes of the regulator at various points are obtained by means of diagrams known as the "polygon of forces" for inclined planes in the well known manner. By means of a number of inclines thus determined, corresponding to the various positions of the armature for varying speeds, the curve of the regulator is set out in development by any of the usual methods.

In cases where the speed is apt to vary very rapidly the inertia of the armature must also be taken into account, along with the other forces, when plotting the curve. In such cases also an air dash-pot arrangement may be used to act along with the spring, the function of the dash pot being to resist too rapid endwise movement of the armature and to offer a negligible resistance to a gradual movement. The dash pot may be produced by a suitable telescopic construction of the collars *n* and *o* as shown, the air leaking through a suitable outlet *r*. As only the edges $h'$, $h^2$ of the slot in the regulator are used for transmitting the driving torque, the other portions of the regulator might be dispensed with, but to afford the better balance they are retained, and for the purpose of holding them firmly in position they are encircled by a ring *s* held to the regulator by screws *t*, see Figs. 5, 6 and 7. In the ring are gaps $s'$ for allowing the end of the peg to pass the ring.

As it is generally desirable in the case of train-lighting systems to provide some method of adjusting the normal output of the dynamo other than by putting resistances in circuit with the field magnet windings, this method having the effect of altering the normal speed of the dynamo, it is proposed to do this by adjusting the initial compression of the controlling spring $p$ by means of the nut $n'$.

As in this invention the armature and frame move along the shaft, and the carrier frame $j$ is mounted on bearings on the spider, it is proposed, in order to automatically vary the "lead" of the brushes relatively to the position of the armature in the magnetic field, to make the stop $m$ with sloping edges, see Fig. 4, so that as the stop $l'$ or $l^2$ on the frame $j$ slides along it, the slope will automatically give the correct "lead" of the brushes as the speed varies and the magnetic field is reduced, which has the effect, as is well known, of reducing the sparking at the commutator.

The current is led away from the brush holders by means of flexible connections $u$ which are of such a length as to allow of the endwise movements of the armature and partial rotation of the frame $j$, and which, in order to avoid entanglement may pass through insulated guide eyes or the like carried by the frame $j$.

The invention as previously described is designed chiefly for train-lighting and in this case the regulator will be constructed so as to give a constant or nearly constant output in order to maintain a practically constant voltage at the lamp terminals, but I do not wish to confine myself to constant output regulation, as I may vary the shape of the regulator so as to regulate in any predetermined manner.

What I claim is:—

1. In dynamo electric machines and in means for automatically controlling the output when the machine is driven at varying speeds, the combination of a driving shaft, a sleeve rotatably and slidably mounted on the driving shaft, an armature secured on such sleeve and capable of sliding therewith along the shaft, a tubular extension also secured to the sleeve and having diverging curved and inclined edges, a peg in the shaft adapted to bear against one or the other of the said edges of the extension and when the shaft is rotated drive the sleeve and armature, a spring for counter balancing the axial component force produced by the driving force of the peg on one of the aforesaid curved and inclined edges of the said extension while allowing of a slip between the said edge of the extension and the peg when the said driving force varies, owing to variations of speed, the inclination of the said inclined edges varying in such a manner that a balance is obtained between the aforesaid axial component force and aforesaid spring, together with any subsidiary forces acting with the spring, for all positions of the armature which corresponds to the various speeds, substantially as set forth.

2. In a dynamo electric machine, a driving shaft, a sliding sleeve on such shaft, an armature and commutator rigidly mounted on the sleeve, a frame rotatably mounted on the spider and formed or provided with projections forming "stops" and brush gear carried by the said frame, in combination with a plate or "stop" on the dynamo casing having sloping and converging edges against one or the other of which the projections on the frame are respectively designed to bear when the frame is given a partial rotation in one direction or the other, and which serve to automatically adjust the "lead" of the brushes as the armature is slid out from, or in toward its normal position between the field magnet poles, substantially as herein set forth.

In witness whereof I have hereunto set my hand in the presence of two witnesses.

THOMAS FERGUSON.

Witnesses:
F. C. PENNINGTON,
P. D. BAILEY.